H. Brown,
Making Staves.
Nº 17,313.    Patented May 19, 1857.
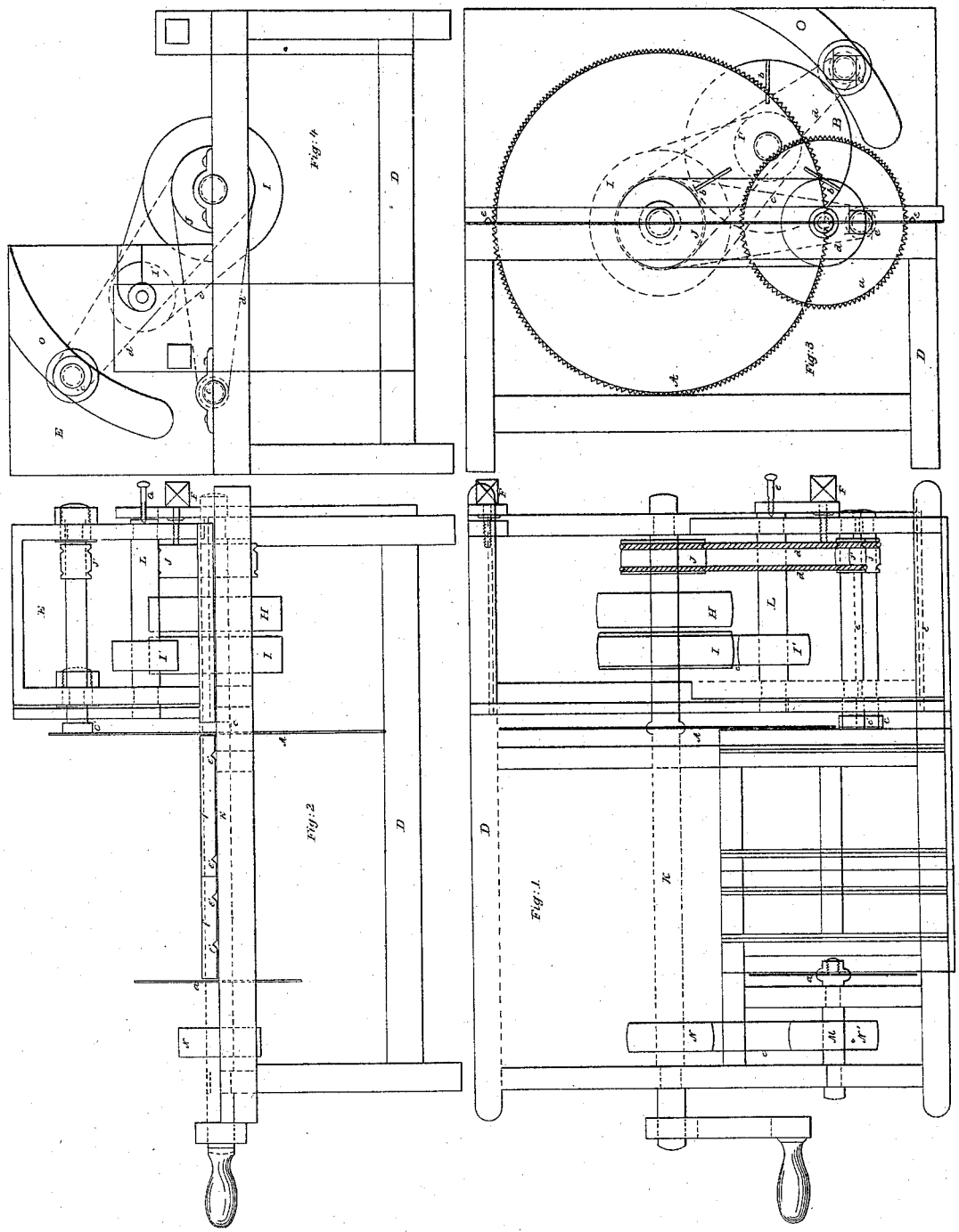

UNITED STATES PATENT OFFICE.

HARVEY BROWN, OF NEW YORK, N. Y.

ARRANGEMENT OF DEVICES FOR DRESSING PIECES OF LUMBER.

Specification of Letters Patent No. 17,313, dated May 19, 1857.

*To all whom it may concern:*

Be it known that I, HARVEY BROWN, of the city, county, and State of New York, have invented a new and useful Machine for Sawing Out and Dressing Pieces of Timber or Wood for Barrel-Heading and other Similar Purposes, which I name a "Machine for Making Pieces for Barrel-Heading;" and I do hereby declare that the following is a full, clear, and exact description of the construction and operation of the same, reference being had to the annexed drawings, making a part of this specification, in which—

Figure 1, is a bird's-eye view or ground plan; Fig. 2, a longitudinal elevation; Fig. 3, a transverse section; Fig. 4, a reversed view of the transverse section.

A, a, are the saws; B, the planer; C, C', the jointers; D, the principal frame; E, the upper frame having a slot, O; F, F, the set screws; G, the small screw bearing against the planer shaft; H, the driving pulley; I, I', the planer pulleys; J, j, j, the jointer pulleys; K, the main shaft; L, the planer shaft; M, the small saw shaft; N, N', the small saw pulleys; b, b, b, the cutters in the planer; c, c, the flat bands; d, d, the round bands; e, e, are ways; f, f, are slides or carriages.

To enable others skilled in the art to make and use my invention I will proceed to describe its construction and operation.

I make a frame, D, proportioned in size and parts according to the work to be performed, to which I attach the main shaft, K, bearing the saw, A; the pulleys, H, I, J, N; the shaft, M, bearing the saw, a, and the pulley N'; the frame, E, set on ways, e, e, e, and bearing the planer, B, and the jointer, C' the bearings of which jointer are movable in the slot, O, so as to joint any width of board or piece within the compass of the machine; and by means of the set screws F, F, the frame, E, is attached to the principal frame D, and adjustable on the ways, e, e, e, by which means any desired thickness of piece can be made, the frame E serving as a gage between its face and the saw, A. Immediately below the frame, E, I attach the jointer C to the frame, D.

The object of my machine is the manufacture of heading from the log. In its operation I take a block sawed off from a log of right length for the heading. This I place on the slide, f', and at the will of the operator is slit toward the heart by the saw, a, (being in motion) any number of times desired and these pieces thus slit can be blocked off from the core or heart of the log by an ax, frow, or otherwise or it can be done wholly with a mallet, frow, and ax, as has long been done, without the aid of the saw and therefore this part of the operation has no claim as it is but a simple circular saw. I next take these blocks one at a time and place them upon the slide, f, and holding them against the face of the frame, E, I move the slide forward toward the saw and planer (now in motion) until the pieces are successively sawed off, planed, and jointed, all being done simultaneously until the block is worked up, and so successively do I manufacture pieces for heading and other purposes. If it is desired to manufacture pieces from blocks that are too large to be parallel and held by the operator conveniently they can be secured and fastened to the slide or carriage by any of the varied forms of dogs or clamps.

I do not claim the saws, planer or jointers separately considered as they are not new and may be substituted in my invention by other forms of saws, planers, and jointers.

I claim—

The movable frame, E, or its equivalent as supporting the planer, B, and the jointer C' which by means of the set screws, F, F, connect it with the frame, D, by which arrangement pieces for barrel heading or other purposes can be sawed, planed, and jointed simultaneously of any desired thickness or width within the compass of the machine substantially in the manner and for the purposes set forth.

HARVEY BROWN.

Witnesses:
WM. C. FREEMAN,
JAMES C. HAYS.